United States Patent
Gutsche et al.

(12)

(10) Patent No.: US 6,329,448 B1
(45) Date of Patent: Dec. 11, 2001

(54) METHOD FOR PRODUCING DYED MOULDING MATERIALS

(75) Inventors: Herbert Gutsche, Kaiserslautern; Rainer Anderlik, Heidelberg; Norbert Kress, Ludwigshafen; Dieter Gress, Meckesheim; Bernd Brian, Dirmstein; Petra Baierweck, Böhl-Iggelheim; Herbert Mosner, Lampertheim; Hermann Brandt, Neustadt; Helmut Heel, Schauernheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/486,636

(22) PCT Filed: Aug. 21, 1998

(86) PCT No.: PCT/EP98/05335
§ 371 Date: Feb. 29, 2000
§ 102(e) Date: Feb. 29, 2000

(87) PCT Pub. No.: WO99/12721
PCT Pub. Date: Mar. 18, 1999

(30) Foreign Application Priority Data

Sep. 5, 1997 (DE) .............................. 197 38 861

(51) Int. Cl.$^7$ .............................. C08J 3/20; B29C 47/10
(52) U.S. Cl. .......................................... 523/319; 523/348
(58) Field of Search ....................... 523/319, 348

(56) References Cited

U.S. PATENT DOCUMENTS

| 3,892,390 | 7/1975 | Eauclaire ........................ 259/192 |
| 4,937,034 | 6/1990 | Sewell .............................. 264/349 |
| 5,486,327 | 1/1996 | Bemis et al. .................... 264/211.21 |
| 5,962,594 | * 10/1999 | Raetzsch et al. ................ 525/285 |

OTHER PUBLICATIONS

Patent Abst. Jp, 04250012, Sep. 4, 1992.
Patent Abst. Jp, 03251420, Nov. 8, 1991.
Patent Abst. Jp 03264319, Nov. 25, 1991.

* cited by examiner

*Primary Examiner*—Kriellion A. Sanders
(74) *Attorney, Agent, or Firm*—Keil & Weinkauf

(57) ABSTRACT

A continuous process for preparing pigmented thermoplastic molding compositions in an extruder, comprises I) in a first zone
 A) metering in from 10 to 99.999% by weight of a thermoplastic polymer into an extruder and
II) in a subsequent zone at temperatures below the respective glass transition temperature of the thermoplastic A)
 B) adding from 0.001 to 60% by weight of a colorant and then heating the thermoplastic/colorant mixture in the subsequent zones, homogenizing the polymer melt and extruding the resultant mixture.

7 Claims, No Drawings

METHOD FOR PRODUCING DYED MOULDING MATERIALS

The invention relates to an improved process for preparing pigmented thermoplastic molding compositions.

The pigmentation of thermoplastics by means of screw compounders has been known for a long time.

For this, pellets of thermoplastic are often metered together with a pigment powder mixture into the hopper of a screw compounder. A disadvantage of this procedure is the circumstance that fine pigment powder particles can become attached to the hopper walls and thus form pigment layers which break away at irregular intervals or are dragged free by the pellets.

A result of this is that undesirable variations in concentration of the pigment can occur in the pigmented polymer.

U.S. Pat. No. 4,937,034 and U.S. Pat. No. 3,892,390 describe apparatus and processes in which design features in the feed hopper of the screw compounder are used to shorten the distances which the pigment powder must fall.

U.S. Pat. No. 4,937,034 describes simultaneous metering of additive concentrate and polymer particles into an extruder, the hopper located over the feed section of the pigment-mixing extruder having a hole through which the additive concentrate is conveyed into the hopper by means of an ancillary metering screw. To prevent the flow of additive from being influenced by the main polymer flow, the additive flow is shielded from the polymer particle flow by a metal guide plate. Both individual flows reach the feed section of the extruder via a drop path which is common to both.

U.S. Pat. No. 3,892,390 discloses an apparatus in which the feed hopper of a pigment-mixing extruder has a hole through which additives reach the hopper by means of an attached conveying screw. The thermoplastic component thus reaches the feed section of the extruder screw together with the additives.

In the processes mentioned, parts of the extruder hopper become coated with pigment powders, causing deviations from consistent color and lengthening changeover times at color changes.

Another version of the process, frequently used for coloration with pigment powders, consists in mixing thermoplastic pellets with the pigment powders and, if desired, other additives in a premixer. With the aid of oils or water or other liquids, the surface of the thermoplastic pellets is coated with a low-molecular-weight film, so that the additives adhere to the pellets.

A disadvantage of this process is the additional introduction of a low-molecular-weight substance, which gives undesirable changes of shade and, for example, of mechanical properties of the pigmented molding compositions.

In this process also, the hopper of the pigment-mixing extruder and upstream pipelines become coated with powders which break off from the pipeline walls and hopper at irregular intervals and cause deviations from color consistency and high cleaning costs at color changes.

It is an object of the present invention to provide an improved preparation process for pigmented thermoplastic molding compositions which gives better color consistency (quality of pigmentation) and lower cleaning costs and time losses at color changes.

We have found that this object is achieved by means of a continuous process for preparing pigmented thermoplastic molding compositions in an extruder, which comprises I) in a first zone
   A) metering in from 10 to 99.999% by weight of a thermoplastic polymer into an extruder and II) in a subsequent zone at temperatures below the respective glass transition temperature of the thermoplastic A)
   B) adding from 0.001 to 60% by weight of a colorant and then heating the thermoplastic/colorant mixture in the subsequent zones, homogenizing the polymer melt and extruding the resultant mixture.

By means of the novel process, color pigment powders and thermoplastic particles are metered separately into the pigment-mixing extruder; in this method, the thermoplastic material reaches the pigment-mixing extruder first, via the hopper, and the pigment powders are only introduced downstream by means of a stuffing screw or other suitable conveying equipment via an opening in the extruder housing.

The pigment powder reaches the extruder at the point where the thermoplastic material is still solid. Since at this point the channels of the screw are filled with thermoplastic pellets or thermoplastic granules, reverse flow of powder into the hopper is avoided, so that there are hardly any deposits of pigment there which can bring about downtime at color changes.

The pigment metering point of the pigment-mixing extruder is continuously swept by the pigment metering point, so that hardly any deposits can form here either.

Since the plastic is as yet unmelted at the point where the pigment is metered in, sticking and crust formation are avoided. At color changes, the pigment powder stuffing screw is exchanged for another clean stuffing screw. This can markedly reduce the time which elapses between the production of two differently pigmented plastics.

In principle, the advantage appears with plastics of any type. Suitable thermoplastics A) are listed, for example, in Kunststoff-Taschenbuch (ed. Saechtling), 1989 edition, where sources of supply are also mentioned. Processes for preparing such thermoplastics are known per se to the person skilled in the art. Some preferred types of plastic will be described in somewhat greater detail below.

1. Polyoxymethylene homo- or copolymers

Such polymers are known per se to the person skilled in the art and are described in the literature.

Very generally, these polymers have at least 50 mol % of recurring units —$CH_2O$— in their main polymer chain.

The homopolymers are generally prepared by polymerizing formaldehyde or trioxane, preferably in the presence of suitable catalysts.

For the purposes of the invention, polyoxymethylene copolymers are preferred as component A, in particular those which, besides the recurring —$CH_2O$— units also have up to 50 mol %, preferably from 0.1 to 20 mol %, in particular from 0.3 to 10 mol % and very particularly preferably from 2 to 6 mol %, of recurring units

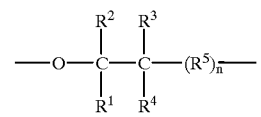

where $R^1$ to $R^4$, independently of one another, are hydrogen, $C_1$–$C_4$-alkyl or halo-substituted alkyl having from 1 to 4 carbon atoms, and $R^5$ is —$CH_2$—, —$CH_2O$—, or methylene substituted with $C_1$–$C_4$-alkyl or with $C_1$–$C_4$-haloalkyl, or is a corresponding oxymethylene group, and n is from 0 to 3. These groups may be advantageously introduced into the copolymers by ring-opening of cyclic ethers. Preferred cyclic ethers are those of the formula

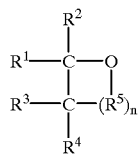

where $R^1$ to $R^5$ and n are as mentioned above. Cyclic ethers mentioned merely as examples are ethylene oxide, 1,2-propylene oxide, 1,2-butylene oxide, 1,3-butylene oxide, 1,3-dioxane, 1,3-dioxolane and 1,3-dioxepan, and as comonomers also linear oligo- and polyformals, such as polydioxolane or polydioxepan.

Other polymers suitable as component A) are oxymethylene terpolymers, prepared, for example, by reacting trioxane and one of the cyclic ethers described above with a third monomer, preferably bifunctional compounds of the formula

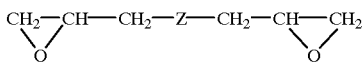

and/or

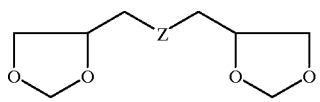

where Z is a chemical bond, —O—, —ORO— (R=$C_1$–$C_8$-alkylene or $C_2$–$C_8$-cycloalkylene).

Preferred monomers of this type are ethylene diglycide, diglycidyl ethers and diethers of glycidyls and formaldehyde, dioxane or trioxane in a molar ratio of 2:1 and diethers of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol and 1,4-cyclohexanediol, to mention just a few examples.

Processes for preparing the homo- and copolymers described above are known to the person skilled in the art and are described in the literature, and so further details are not necessary here.

The preferred polyoxymethylene copolymers have melting points of at least 150° C. and molecular weights (weight-average) $M_w$ in the range from 5000 to 200,000, preferably from 7000 to 150,000.

End-group-stabilized polyoxymethylene polymers which have C—C bonds at the chain ends are particularly preferred.

2. Polycarbonates and polyesters

Suitable polycarbonates are known per se and obtainable, for example, in accordance with the processes of DE-B-1 300 266 by interfacial polycondensation or by the process of DE-A-14 95 730 by reacting diphenyl carbonate with bisphenols. A preferred bisphenol is 2,2-di(4-hydroxyphenyl)propane, which generally, and below, is termed bisphenol A.

Instead of bisphenol A, it is also possible to use other aromatic dihydroxy compounds, in particular 2,2-di(4-hydroxyphenyl)pentane, 2,6-dihydroxynapthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxybiphenyl, and also mixtures of the abovementioned dihydroxy compounds.

Particularly preferred polycarbonates are those based on bisphenol A or bisphenol A together with up to 30 mol % of the abovementioned aromatic dihydroxy compounds.

The relative viscosity of these polycarbonates (measured at 23° C. in a 0.5% strength by weight solution in dichloromethane) is generally in the range from 1.1 to 1.5, in particular from 1.28 to 1.4.

Suitable polyesters are likewise known per se and described in the literature. They contain, in the main chain, an aromatic ring derived from an aromatic dicarboxylic acid. The aromatic ring may also be substituted, for example with halogen, such as chlorine and bromine, or with $C_1$–$C_4$-alkyl, such as methyl, ethyl-, isopropyl, n-propyl, n-butyl, isobutyl or tert-butyl.

The polyesters may be prepared by reacting aromatic dicarboxylic acids, their esters or other ester-forming derivatives of these, with aliphatic dihydroxy compounds in a manner known per se.

Polyalkylene terephthalates of this type are known per se and described in the literature. They contain, in the main chain, an aromatic ring derived from an aromatic dicarboxylic acid. The aromatic ring may also be substituted, for example with halogen, such as chlorine and bromine, or with $C_1$–$C_4$-alkyl, such as methyl, ethyl-, isopropyl, n-propyl, n-butyl, isobutyl or tert-butyl.

These polyalkylene terephthalates may be prepared by reacting aromatic dicarboxylic acids, their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylanol and neopentylglycol, and mixtures of these.

Particularly preferred polyesters (A) are polyalkylene terephthalates derived from alkanediols having from 2 to 6 carbon atoms. Of these, particular preference is given to polyethylene terephthalate and polybutylene terephthalate and mixtures of these, and it is also possible to use polyethylene terephthalate as recycled material at up to 50% by weight, based on A).

The viscosity number of the polyesters (A) (measured in a 0.5% strength by weight solution in a mixture of phenol and o-dichlorobenzene, weight ratio 1:1, at 25° C.) is generally in the range from 60 to 220, preferably from 100 to 150.

Particular preference is given to polyesters whose content of carboxyl end groups is up to 100 mval/kg of polyester, preferably up to 50 mval/kg of polyester and in particular up to 40 mval/kg of polyester. Such polyesters may be prepared, for example, by the process of DE-A 44 01 055. The carboxyl end group content is usually determined by titration methods (eg. potentiometry).

A further class to mention is that of aromatic polyesters derived from aromatic dicarboxylic acids and aromatic dihydroxy compounds.

Suitable aromatic dicarboxylic acids are those described above for the polyalkylene terephthalates. Preference is given to mixtures of from 5 to 100 mol % of isophthalic acid and from 0 to 95 mol % of terephthalic acid, in particular mixtures of from about 80 to about 50% of terephthalic acid with from about 20 to about 50% of isophthalic acid.

The aromatic dihydroxy compounds preferably have the formula

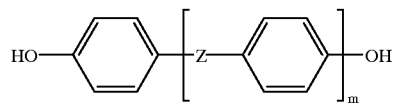

where Z is alkylene or cycloalkylene having up to 8 carbon atoms, arylene having up to 12 carbon atoms, carbonyl, sulfonyl, an oxygen or sulfur atom or a chemical bond, and m is from 0 to 2. The compounds may also carry $C_1$–$C_6$-alkyl or -alkoxy and fluorine, chlorine or bromine as substituents on the phenylene groups.

Representative examples of these compounds are dihydroxybiphenyl,
  di(hydroxyphenyl)alkane,
  di(hydroxyphenyl)cycloalkane,
  di(hydroxyphenyl) sulfide,
  di(hydroxyphenyl) ether,
  di(hydroxyphenyl)ketone,
  di(hydroxyphenyl) sulfoxide,
  $\alpha,\alpha'$-di(hydroxyphenyl)dialkylbenzene,
  di(hydroxyphenyl) sulfone, di(hydroxybenzoyl)benzene, resorcinol and
  hydroquinone, and also the ring-alkylated and ring-halogenated derivatives of these.
Preferred compounds among these are
4,4'-dihydroxybiphenyl,
2,4-di(4'-hydroxyphenyl)-2-methylbutane
$\alpha,\alpha''$-di(4-hydroxyphenyl)-p-diisopropylbenzene,
2,2-di(3'-methyl-4'-hydroxyphenyl)propane and
2,2-di(3'-chloro-4'-hydroxyphenyl)propane
and in particular
2,2-di(4'-hydroxyphenyl)propane,
2,2-di(3',5'-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane or mixtures of these.

It is, of course, also possible to employ mixtures of polyalkylene terephthalates and completely aromatic polyesters. These generally comprise from 20 to 98% by weight of the polyalkylene terephthalate and from 2 to 80% by weight of the completely aromatic polyester. It is, of course, also possible to use polyester block copolymers, such as copolyetheresters. Such products are known per se and are described in the literature, eg. in U.S. Pat. No. 3,651,014. Corresponding products are also available commercially, eg. Hytrel® (DuPont).

Preferred dicarboxylic acids are naphthalenedicarboxylic acid, terephthalic acid and isophthalic acid or mixtures of these. Up to 10 mol % of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol and neopentyl glycol or mixtures of these.

Particularly preferred polyesters are polyalkylene terephthalates derived from alkanediols having from 2 to 6 carbon atoms. Of these, polyethylene terephthalate, polyethylene naphthalate and polybutylene terephthalate are particularly preferred.

The viscosity number of the polyesters (measured in a 0.5% strength by weight solution in a mixture of phenol and o-dichlorobenzene (weight ratio 1:1) at 23° C.) is generally in the range from 60 to 200 ml/g.

3. Polyolefins

Examples of these are very generally polyethylene and polypropylene, and also copolymers based on ethylene or propylene, if desired also with higher α-olefins. Corresponding products are obtainable under the trade names Lupolen® and Novolen® from BASF Aktiengesellschaft.

4. Polymethacrylates

Examples of these are in particular polymethyl methacrylate (PMMA), and also copolymers based on methyl methacrylate with up to 40% by weight of other copolymerizable monomers, as obtainable, for example, under the designations Lucryl® from BASF Aktiengesellschaft or Plexiglas® from Röhm GmbH.

5. Polyamides

The polyamides of the novel molding compositions generally have a viscosity number, determined in a 0.5% strength by weight solution in 96% strength by weight sulfuric acid at 25° C. according to ISO 307, of from 90 to 350 ml/g, preferably from 110 to 240 ml/g.

Preference is given to semicrystalline or amorphous resins with a molecular weight (weight-average) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, for example polycaprolactam, polycaprylolactam and polylaurolactam, and also polyamides obtained by reacting dicarboxylic acids with diamines.

Dicarboxylic acids which may be used are alkanedicarboxylic acids having from 6 to 12 carbon atoms, in particular from 6 to 10 carbon atoms and aromatic dicarboxylic acids. Acids merely mentioned here are adipic acid, azelaic acid, sebacic acid, dodecanedioic acid and terephthalic and/or isophthalic acid.

Particularly suitable diamines are alkanediamines having from 6 to 12 carbon atoms, in particular from 6 to 8 carbon atoms, and also m-xylylenediamine, di(4-aminophenyl)methane, di(4-aminocyclohexyl)methane, 2,2-di(4-aminophenyl)propane and 2,2-di(4-aminocyclohexyl)propane.

Preferred polyamides are polyhexamethylene adipamide, polyhexamethylene sebacamide and polycaprolactam, and also nylon-6/6,6, particularly with a proportion of from 5 to 95% by weight of caprolactam units.

In addition, mention may also be made of polyamides obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Other suitable polyamides are mixtures of more than one polyamide in any desired mixing ratio or polyamides obtainable by copolymerizing two or more of the abovementioned monomers.

Partially aromatic copolyamides, such as nylon-6/6,T and nylon-6,6/6,T, whose triamine content is less than 0.5% by weight, preferably less than 0.3% by weight have also proven particularly advantageous (see EP-A 299 444).

The preferred partially aromatic copolyamides with low triamine content may be prepared by the processes described in EP-A 129 195 and 129 196.

It is, of course, also possible to use mixtures (blends) of such polymers.

6. Vinylaromatic polymers

The molecular weight of these polymers, which are known per se and commercially available, is generally in the range from 1500 to 2,000,000, preferably from 70,000 to 1,000,000.

Merely as representatives of the class, mention may be made here of vinylaromatic polymers made from styrene, chlorostyrene, α-methylstyrene and p-methylstyrene; comonomers, such as (meth)acrylonitrile or (meth)acrylates may also be involved in the construction in subordinate proportions (preferably not more than 20% by weight, in particular not more than 8% by weight). Particularly preferred vinylaromatic polymers are polystyrene and impact-modified polystyrene. Mixtures of these polymers may, of course, also be used. They are preferably prepared by the process described in EP-A-302 485.

Preferred ASA polymers are built up from a soft or rubber phase made from a graft polymer made from:

$A_1$ from 50 to 90% by weight of a graft base based on $A_{11}$ from 95 to 99.9% by weight of a $C_2$–$C_{10}$-alkyl acrylate and $A_{12}$ from 0.1 to 5% by weight of a bifunctional monomer having two non-conjugated olefinic double bonds, and $A_2$ from 10 to 50% by weight of a graft made from $A_{21}$ from 20 to 50% by weight of styrene or substituted styrenes of the formula II or mixtures of these, and $A_{22}$ from 10 to 80% by weight of acrylonitrile, methacrylonitrile, acrylates or methacrylates or mixtures of these, in a mixture with a hard matrix based on an SAN copolymer $A_3$) made from:

$A_{31}$ from 50 to 90% by weight, preferably from 55 to 90% by weight and in particular from 65 to 85% by weight of styrene and/or substituted styrenes of the formula II and $A_{32}$ from 10 to 50% by weight, preferably from 10 to 45% by weight and in particular from 15 to 35% by weight of acrylonitrile and/or methacrylonitrile.

Component $A_1$) is an elastomer which has a glass transition temperature of below –20° C., in particular below –30° C.

For preparing the elastomer, the main monomers $A_{11}$) used are acrylates having from 2 to 10 carbon atoms, in particular from 4 to 8 carbon atoms. Particularly preferred monomers are tert-butyl, isobutyl and n-butyl acrylate, and also 2-ethylhexyl acrylate, of which the two last named are particularly preferred.

Besides these acrylates, use is made of from 0.1 to 5% by weight, in particular from 1 to 4% by weight, based on the total weight $A_{11}+A_{12}$, of a polyfunctional monomer having at least two non-conjugated olefinic double bonds. Of these, preference is given to bifunctional compounds, ie. having two non-conjugated double bonds. Examples of these are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $A_1$ are known per se and are described, for example, in DE-B 1 260 135. Corresponding products are also commercially available.

Preparation by emulsion polymerization has proven particularly advantageous in a number of cases.

The precise polymerization conditions, in particular the type, amount, and method of addition of the emulsifier are preferably selected so that the acrylate latex, which is at least partially crosslinked, has an average particle size (weight average $d_{50}$) in the range from about 200 to 700 nm, in particular from 250 to 600 nm. The latex preferably has a narrow particle size distribution, ie. the quotient $$Q = \frac{d_{90} - d_{10}}{d_{50}}$$

is preferably smaller than 0.5, in particular smaller than 0.35.

The proportion of the graft base $A_1$ in the graft polymer $A_1+A_2$ is from 50 to 90% by weight, preferably from 55 to 85% by weight and in particular from 60 to 80% by weight, based on the total weight of $A_1+A_2$.

A graft shell $A_2$ is grafted onto the graft base $A_1$ and is obtainable by copolymerizing $A_{21}$ from 20 to 90% by weight, preferably from 30 to 90% by weight and in particular from 30 to 80% by weight, of styrene or substituted styrenes of the formula

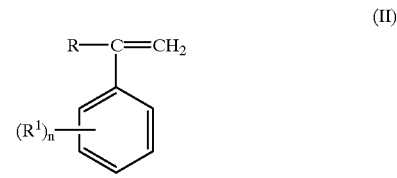

(II)

where R is alkyl having from 1 to 8 carbon atoms, hydrogen or halogen and $R^1$ is alkyl having from 1 to 8 carbon atoms or halogen, and n is 0, 1, 2 or 3, and $A_{22}$ from 10 to 80% by weight, preferably from 10 to 70% by weight and in particular from 20 to 70% by weight, of acrylonitrile, methacrylonitrile, acrylates or methacrylates or mixtures of these.

Examples of substituted styrenes are α-methylstyrene, p-methylstyrene, p-chlorostyrene and p-chloro-α-methylstyrene, preference being given to styrene and α-methylstyrene.

Preferred (meth)acrylates are those whose homopolymers or copolymers with the other monomers of component $A_{22}$) have glass transition temperatures above 20° C.; in principle, however, it is also possible to use other acrylates, preferably in amounts which give a glass transition temperature $T_g$ of above 20° C. overall for component $A_2$.

Particular preference is given to esters of acrylic or methacrylic acid with $C_1$–$C_8$ alcohols and epoxy-containing esters, such as glycidyl acrylate and glycidyl methacrylate. Very particularly preferred examples are methyl methacrylate, tert-butyl methacrylate, glycidyl methacrylate and n-butyl acrylate, the last named, because of its property of forming polymers having very low $T_g$, preferably not being used in too high a proportion.

The graft shell $A_2$) may be prepared in one or more, eg. two or three, steps, the overall formulation remaining unaffected thereby.

The graft shell is preferably prepared in emulsion, as described, for example, in German Patent 12 60 135, DE-A 32 27 555, DE-A 31 49 357 and DE-A 34 14 118.

Depending on the conditions selected, the graft copolymerization gives a certain propoprtion of free copolymers of styrene and/or substituted styrene derivatives and (meth)acrylonitrile and/or (meth)acrylates.

The graft copolymer $A_1+A_2$ generally has an average particle size of from 100 to 1000 nm, in particular from 200 to 700 nm, ($d_{50}$ weight average). The conditions for preparing the elastomer $D_1$) and for the grafting are therefore preferably selected so that particle sizes in this range result. Measures for this are known and are described, for example, in German Patent 1 260 135 and DE-A 28 26 925, and also in Journal of Applied Polymer Science, Vol. 9 (1965), p. 2929–2938. The increase in size of elastomer latex particles may be brought about, for example, by means of agglomeration.

For the purposes of this invention, the free, non-grafted homo- and copolymers produced during the graft copolymerization to prepare component $A_2$) also count as part of the graft polymer $(A_1+A_2)$.

Some preferred graft polymers will be cited below:
1: 60% by weight of graft base $A_1$ made from $A_{11}$ 98% by weight of n-butyl acrylate and $A_{12}$ 2% by weight of dihydrodicyclopentadienyl acrylate and 40% by weight of graft shell $A_2$ made from $A_{21}$ 75% by weight of styrene and $A_{22}$ 25% by weight of acrylonitrile
2: Graft base as in 1 with 5% by weight of a first graft shell made from styrene and 35% by weight of a second graft made from $A_{21}$ 75% by weight of styrene and $A_{22}$ 25% by weight of acrylonitrile
3: Graft base as in 1 with 13% by weight of a first graft made from styrene and 27% by weight of a second graft made from styrene and acrylonitrile in a weight ratio of 3:1.

The products present as component $A_3$) may be prepared, for example, by the process described in DE-B 10 01 001 and DE-B 10 03 436. Such copolymers are also available commercially. The weight-average molecular weight, determined by light scattering, is preferably in the range from 50,000 to 500,000, in particular from 100,000 to 250,000.

The weight ratio of $(A_1+A_2):A_3$ is in the range from 1:2.5 to 2.5:1, preferably from 1:2 to 2:1 and in particular from 1:1.5 to 1.5:1.

SAN polymers suitable as component A) are described above (see $A_{31}$ and $A_{32}$).

The viscosity number of the SAN polymers, measured according to DIN 53 727 as 0.5% strength by weight solution in dimethylformamide at 23° C. is generally in the range from 40 to 100 ml/g, preferably from 50 to 80 ml/g.

ABS polymers as polymer (A) in the novel multiphase polymer mixtures have the same structure as that described above for ASA polymers. Instead of the acrylate rubber $A_1$) of the graft base in the ASA polymer, conjugated dienes are usually used, so that the following formulation preferably results for the graft base $A_4$:

$A_{41}$ from 70 to 100% by weight of a conjugated diene and $A_{42}$ from 0 to 30% by weight of a bifunctional monomer having two non-conjugated olefinic double bonds.

Graft $A_2$ and the hard matrix of the SAN copolymer $A_3$) remain unchanged in the formulation. Such products are available commercially. The preparation processes are known to the person skilled in the art, and therefore further information on this topic is not necessary.

The weight ratio of $(A_4+A_2):A_3$ is in the range from 3:1 to 1:3, preferably from 2:1 to 1:2.

Particularly preferred formulations of the thermoplastic molding compositions contain, as component A) a mixture of:

$A_1$) from 10 to 90% by weight of a polybutylene terephthalate $A_2$) from 0 to 40% by weight of a polyethylene terephthalate $A_3$) from 1 to 40% by weight of an ASA or ABS polymer or mixtures of these Such products are obtainable under the product name Ultradur® S (previously Ultrablend® S) from BASF Aktiengesellschaft.

Other preferred formulations of component A) comprise $A_1$) from 10 to 90% by weight of a polycarbonate $A_2$) from 0 to 40% by weight of a polyester, preferably polybutylene terephthalate, and $A_3$) from 1 to 40% by weight of an ASA or ABS polymer or mixtures of these.

Such products are obtainable under the product name Terblend® from BASF AG.

7. Polyarylene ethers

For the purposes of the invention, polyarylene ethers A) are preferably either polyarylene ethers per se, polyarylene ether sulfides, polyarylene ether sulfones or polyarylene ether ketones. The arylene groups of these may be identical or different and, independently of one another, are aromatic radicals having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene and 2,6-anthrylene. Among these, 1,4-phenylene and 4,4'-biphenylene are preferred. These aromatic radicals are preferably unsubstituted, but they may carry one or more substituents. Examples of suitable substituents are alkyl, arylalkyl, aryl, nitro, cyano and alkoxy, and also heteroaromatics, such as pyridine, and halogens. Preferred substituents include alkyl having up to 10 carbon atoms, such as methyl, ethyl, isopropyl, n-hexyl, isohexyl, $C_1$–$C_{10}$-alkoxy, such as methoxy, ethoxy, n-propoxy, n-butoxy, aryl having up to 20 carbon atoms, such as phenyl and naphthyl, and also fluorine and chlorine. Besides —O—, these may be linked to one another by, for example, —S—, —SO—, —SO$_2$—, —CO—, —N=N—, —COO—, alkylene or a chemical bond. In the polyarylene ethers, the arylene groups may also be linked with one another via different groups.

Preferred polyarylene ethers include those with recurring units of the formula I

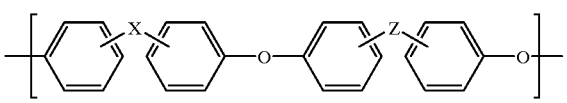

(I)

The ring-substituted derivatives of these may likewise be used. Preferred substituents are $C_1$–$C_6$-alkyl, such as methyl, ethyl or tert-butyl, $C_1$–$C_6$-alkoxy, such as methoxy or ethoxy, aryl, in particular phenyl, chlorine or fluorine. The variable X may be —SO$_2$—, —SO—, —S—, —O—, CO, —N=N—, —RC=CR$^a$—, —CR$^b$R$^c$— or a chemical bond. The variable Z may be —SO$_2$—, —SO—, —CO—, —O—, —N=N— or —RC=CR$^a$. Each of R and R$^a$ here is hydrogen, $C_1$–$C_6$-alkyl, eg. methyl, n-propyl or n-hexyl, $C_1$–$C_6$-alkoxy, including methoxy, ethoxy and butoxy, or aryl, in particular phenyl. R$^b$ and R$^c$ may each be hydrogen or $C_1$–$C_6$-alkyl, in particular methyl. They may, however, also be linked with one another to give a $C_4$–$C_{10}$-cycloalkyl ring, preferably a cyclopentyl or cyclohexyl ring, which in turn may be substituted with one or more alkyl groups, preferably methyl. Besides this, $R^b$ and $R^c$ may also be $C_1$–$C_6$-alkoxy, eg. methoxy or ethoxy, or aryl, particularly phenyl. The abovementioned groups may in turn each be substituted with chlorine or fluorine.
Some preferred recurring units I are listed below:
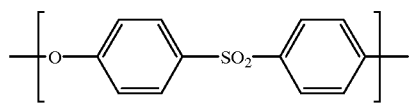
($I_1$)
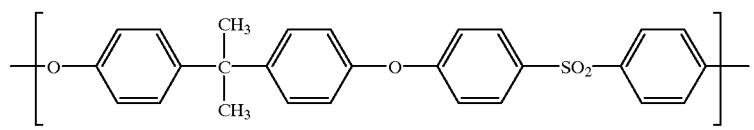
($I_2$)
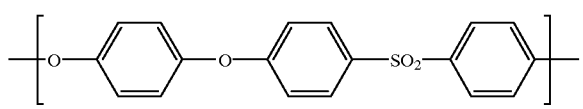
($I_3$)
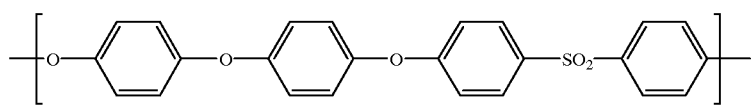
($I_4$)
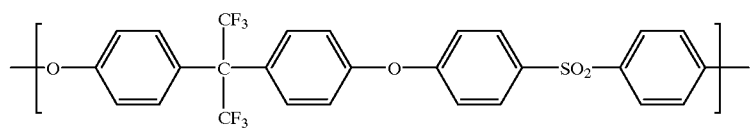
($I_5$)
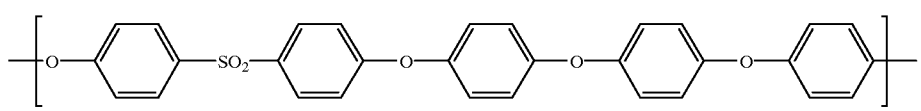
($I_6$)
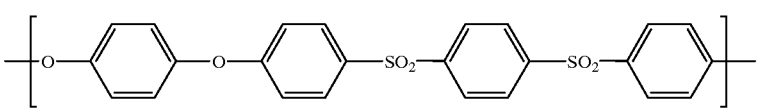
($I_7$)
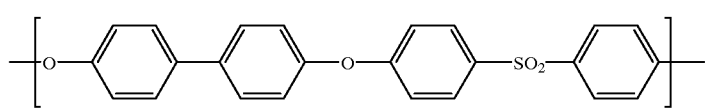
($I_8$)
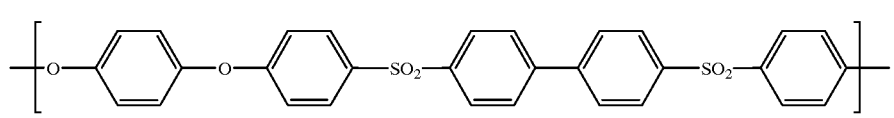
($I_9$)
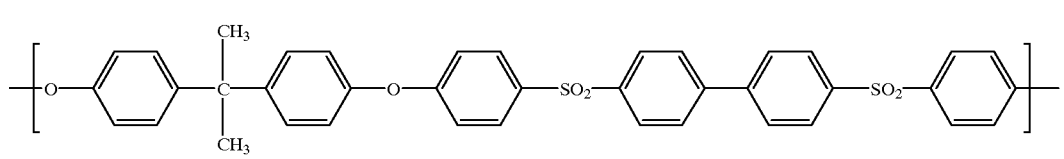
($I_{10}$)
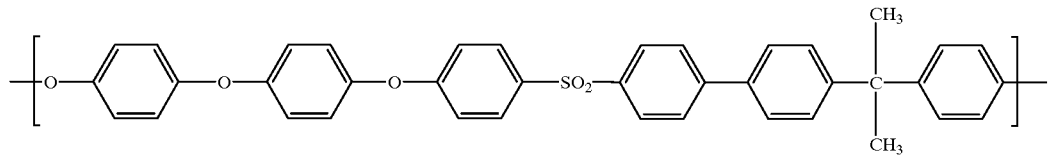
($I_{11}$)

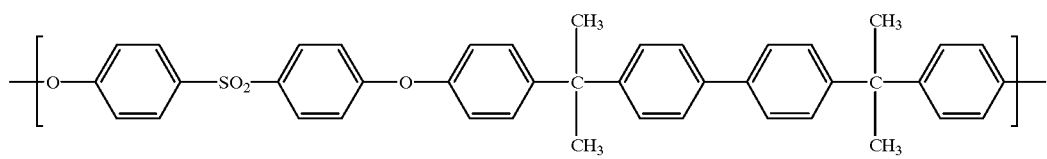
(I₁₂)
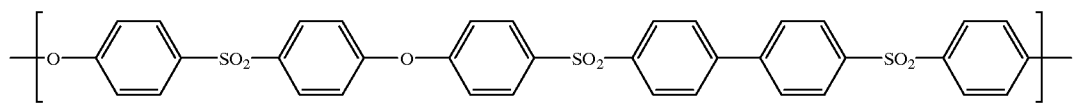
(I₁₃)
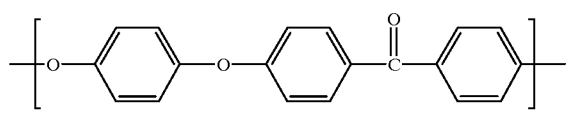
(I₁₄)
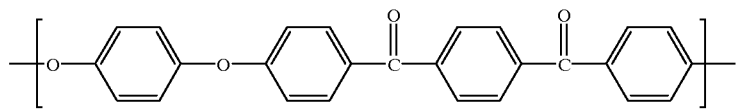
(I₁₅)
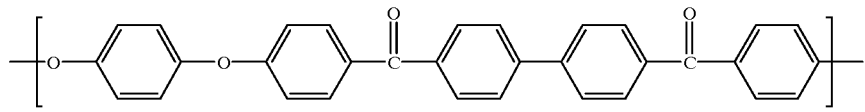
(I₁₆)
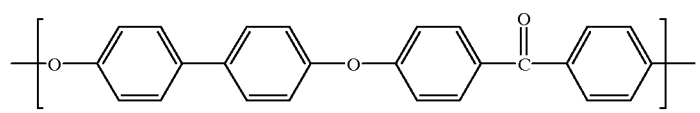
(I₁₇)
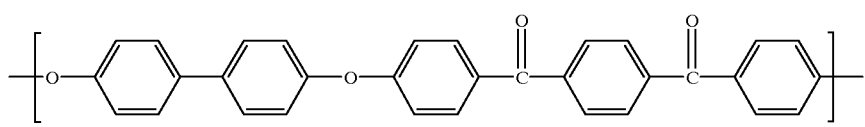
(I₁₈)
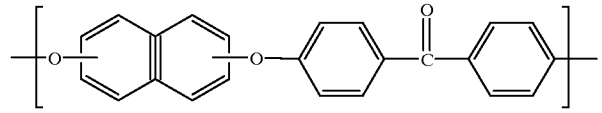
(I₁₉)
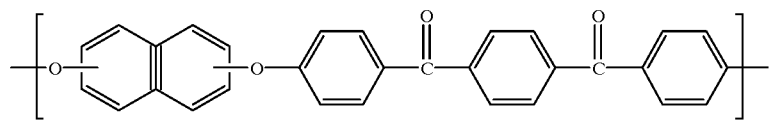
(I₂₀)
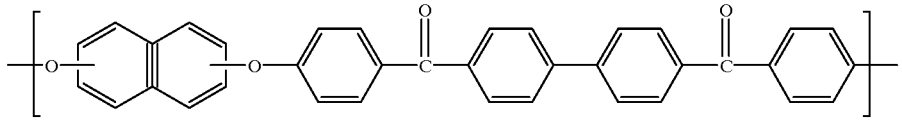
(I₂₁)
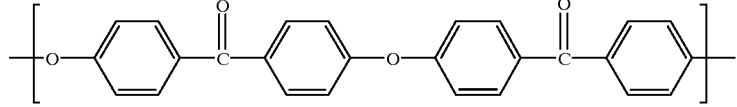
(I₂₂)

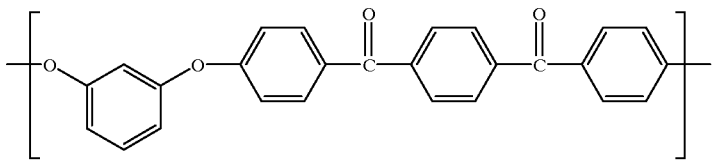 (I₂₃)

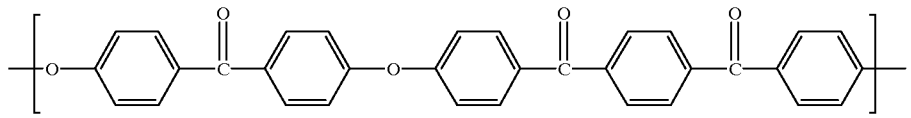 (I₂₄)

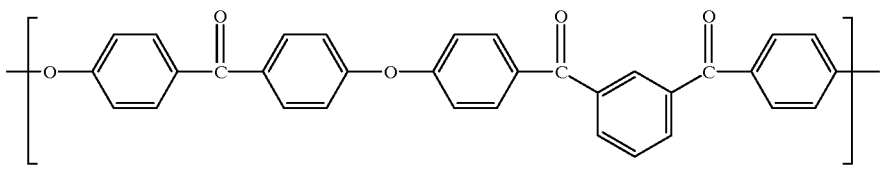 (I₂₅)

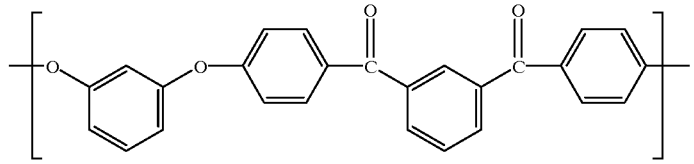 (I₂₆)

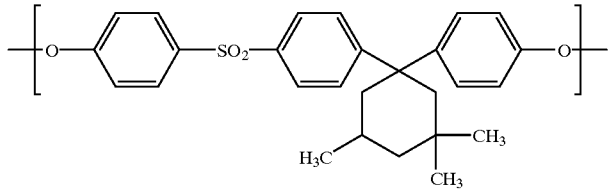 (I₂₇)

Very particularly preferred polyarylene ethers are those which contain ($I_1$), ($I_2$), ($I_{24}$) or ($I_{25}$) as recurring units. These include, for example, polyarylene ether sulfones with from 0 to 100 mol %, preferably from 5 to 95 mol %, of structural units ($I_1$) and from 0 to 100 mol %, preferably from 5 to 95 mol %, of structural units ($I_2$).

The polyarylene ethers may also be copolymers or block copolymers, in which there are polyarylene ether segments and segments of other thermoplastic polymers, such as polyamides, polyesters, aromatic polycarbonates, polyestercarbonates, polysiloxanes, polyimides and polyetherimides. The molecular weights of the blocks or of the graft branches in the copolymers is generally in the range from 1000 to 30,000 g/mol. The blocks of different structure may be arranged alternately or randomly. The proportion by weight of the polyarylene ether segments in the copolymers or block copolymers is generally at least 3% by weight, preferably at least 10% by weight. The proportion by weight of the polyarylene ether sulfones or polyarylene ether ketones may be up to 97% by weight. Preference is given to copolymers or block copolymers with a proportion by weight of polyarylene ether segments of up to 90% by weight. Particular preference is given to copolymers or block copolymers with from 20 to 80% by weight of polyarylene ether segments.

The polyarylene ethers generally have average molecular weights $\overline{M}_n$ (number-average) in the range from 10,000 to 60,000 g/mol and viscosity numbers from 30 to 150 ml/g. Depending on the solubility of the polyarylene ethers (A), the viscosity numbers are measured either in 1% strength by weight N-methylpyrrolidone solution, in mixtures of phenol and o-dichlorobenzene, or in 96% strength sulfuric acid, in each case at 20° C. or 25° C.

The polyarylene ethers are known per se or may be prepared by methods known per se.

Polyphenylene ethers may be prepared, for example, by oxidative coupling of phenols. Polyarylene ether sulfones or polyarylene ether ketones are produced, for example, by condensing aromatic bishalogen compounds and the alkali metal double salts of aromatic bisphenols. They may also, for example, be prepared by autocondensation of alkali metal salts of aromatic halophenols in the presence of a catalyst.

The monomers are preferably reacted in the melt or in an inert high-boiling solvent. These include chlorobenzene, dichlorobenzene, xylene and trichlorobenzene, and also sulfones or sulfoxides, in particular dimethyl sulfone, diethyl sulfone, 1,1-dioxotetrahydrothiophene (sulfolane) or diphenyl sulfone, dimethyl sulfoxide or diethyl sulfoxide, preferably dimethyl sulfoxide. Preferred solvents also include N-alkylpyrrolidones, in particular N-methylpyrrolidone. It is also possible to use N-substituted amides, such as N,N-dimethylformamide or N,N-dimethylacetamide. Mixtures of different solvents may also be used.

Preferred process conditions for synthesizing polyarylene ether sulfones or polyarylene ether ketones are described, for example, in EP-A-113 112 and 135 130.

The preferred polyarylene ethers generally have a melting point of at least 320° C. (polyarylene ether sulfones) or of at least 370° C. (polyarylene ether ketones).

According to the invention, the molding compositions may contain polyarylene ether sulfones or polyarylene ether ketones which in each case are obtainable by reacting a polyarylene ether sulfone or polyarylene ether ketone with a reactive compound. The reactive compounds contain, besides a carbon-carbon double or triple bond, one or more carbonyl, carboxylic acid, carboxylate, anhydride, imide, carboxylic ester, amino, hydroxyl, epoxy, oxazoline, urethane, urea, lactam or halobenzyl groups.

Examples of typical suitable compounds are maleic acid, methylmaleic acid, itaconic acid, tetrahydrophthalic acid, the associated anhydrides and imides, fumaric acid, the mono- and diesters of these acids, eg. of $C_1$–$C_{18}$-alkanols, and the mono- or diamides of these acids, such as N-phenylmaleimide and maleic hydrazide.

Preference is given to the use of $\alpha,\beta$-unsaturated dicarboxylic acids and/or anhydrides of these, and diesters and monoesters of the structures IV and V below.

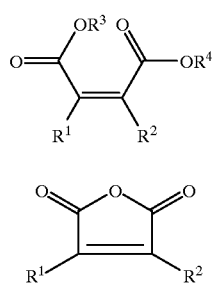

where $R^1$, $R^2$, $R^3$ and $R^4$, independently of one another, are hydrogen or $C_1$–$C_{18}$-alkyl.

Particularly suitable compounds are maleic anhydride, fumaric acid and itaconic acid.

The polymers and the reactive compound may, for example, be reacted with one another in an aromatic solvent. Solvents which have proven particularly suitable are chlorobenzene, o-dichlorobenzene and N-methylpyrrolidone. A conventional free-radical initiator is generally used here. The reaction is generally carried through at from 75–150° C. The reaction product is obtained by precipitating with a conventional precipitating agent, such as low-molecular-weight alcohol and ketone, or by removing the solvent (eg. in a vented extruder or thin-film evaporator).

However, the participants in the reaction may also, for example, be reacted at from 270–350° C. in the melt in a continuously operating or batch mixing system (eg. single- or twin-screw extruder or kneader).

The reactive compound here is preferably metered into the polymer melt in liquid form, in particular within the kneading zone of a mixing apparatus.

Preference is given to the use of modified polyarylene ether sulfones or polyarylene ether ketones which have been obtained by reacting from 80 to 99.9% by weight, in particular from 90 to 99% by weight, of the unmodified polyarylene ether sulfones or polyarylene ether ketones with from 0.1 to 20% by weight, in particular from 1 to 10% by weight, of the reactive compound.

Particular preference is given to polyarylene ether sulfones grafted with from 0.1 to 1.5% by weight of maleic anhydride, polyarylene ether sulfones containing from 5 to 95 mol % of units $I_1$ and from 5 to 95 mol % of units $I_2$ being preferred here.

Particular mention may be made here of polyarylene ether sulfones having from 80 to 95 mol %, preferably from 85 to 95 mol %, of units of the formula $I_2$ or $I_1$, and correspondingly from 5 to 20 mol %, preferably from 5 to 15 mol %, of units of the formula $I_1$ or $I_2$, respectively.

Free-radical initiators which may be used are generally those compounds described in the technical literature (eg. J. K. Kochi, Free Radicals, J. Wiley, New York, 1973).

The free-radical initiators are usually used in amounts of from about 0.01 to about 1% by weight, based on the polyarylene ether sulfones or polyarylene ether ketones used. It is, of course, also possible to use mixtures of different free-radical initiators.

WO 87/00540, for example, discloses modified polyphenylene ethers of this type, which may be used in particular in mixtures with polyamide.

The proportion by weight of thermoplastics is generally in the range from 10 to 99.999% by weight, preferably from 45 to 99.99% by weight and in particular from 90 to 99.9% by weight.

For the purposes of the invention, a colorant B) is generally any coloring substance according to DIN 55944, and these may be divided into inorganic and organic, and also naturally occurring and synthetic, colorants (see R ömpps Chemie Lexikon, 1981, 8th Edition, p. 1237).

Suitable colorants are selected from the class of black, white, red, green, yellow and blue pigments, and are preferably used in powder form.

Pigments are either organic or inorganic colorants and differ from dyes, since pigments are insoluble in solvents and/or binders. They are generally classified according to the color index (C.I.), a C.I. designation which permits unique identification being added onto their systematic or trivial names.

Preferred pigments are copper phthalocyanine pigments which have a green or blue color. The green color is generally achieved by substituting hydrogen with chlorine on the macrocyclic tetraamine.

Other suitable pigments are ultramarine pigments (sodium aluminum silicates), blue and green pigments based, for example, on oxides of chromium or cobalt with spinel structure. Such pigments are obtainable under the trade names Heliogen® blue, Heliogen® green, Sicopal® green, Sicopal® blue (registered trade mark of BASF AG), and also as ultramarine or chrome oxide pigment.

Preferred pigments according to C.I. Part 1 are Pigment Blue 15, Pigment Blue 15:2, Pigment Blue 15:4, Pigment Blue 28, Pigment Blue 29, Pigment Blue 36, Pigment Green 7, Pigment Green 50, Pigment Violet 15, Pigment Violet 16, Pigment Brown 24, Pigment Brown 29, Pigment Yellow 164 and Pigment Yellow 53, particular preference being given to Pigment Blue 15:1, 15:3 and 36 and Pigment Green 7.

The pigments generally have an average particle diameter of from 0.3 to 8 $\mu$m, preferably from 0.7 to 7 $\mu$m.

The unit cell of the spinel lattice comprises 32 oxygen atoms, forming an approximately cubic close-packed structure. In the normal spinel structure, each of 8 $Me^{2+}$ ions is located at the center of octahedrons formed from 4 $O^{2-}$ ions (octahedral position). In the structure known as inverse spinel structure, the cations are differently distributed. One half of the $Me^{3}+$ ions occupies the tetrahedral positions, and the other half together with the $Me^{2+}$ ions is distributed over the octahedral positions. Transitions between the two structures with unordered distribution of the cations are also possible. The normal and inverse structures may be indicated by the formulae $Me^{2+}[Me_2^{3+}]O_4$ and $Me^{3+}[Me^{2+}Me^{3+}]O_4$.

The ferrites include representatives of both structures: zinc ferrite has the normal structure $Zn[Fe_2]O_4$, but in magnesium ferrite the cations are very predominantly distributed as in the inverse spinel: $Fe^{3+}[Mg^{2+}Fe^{3+}]O_4$.

Examples of bivalent metals are Mg, Fe(II), Zn, Mn, Co, Ni, Cu, Cd, and examples of trivalent metals are Al, Fe(III), V, Cr and titanium. Preferred iron oxide pigments are magnetite (inverse spinel $Fe^{3+}[Fe^{2+}Fe^{3+}]O_4$), $Cr^{3+}[Cu^{II}, Fe^{III}]O_4$ and $Fe_2O_3/Mn_2O_3$ mixed phase pigments.

In these mixed phase pigments, guest ions are incorporated into certain host lattices, allowing specific color effects to be obtained, depending on the guest ions selected. The incorporation does not change the basic structure of the host lattice. The incorporation of the foreign ions changes only the dimension of the unit cell, ie. the lattice constants. To prepare stable pigments, it is useful to start with structures which have particularly good stability. These include in particular the spinel structure. Lightfast black pigments may be obtained by partial or complete substitution of the metal ions in the spinel by guest ions which impart color, for example chromium and copper.

Examples of preferred commercially available black pigments are Pigment Black 11, Fast Black 100 and Bayferrox® black grades (Bayer).

The pigments for pigmenting thermoplastics are well known, see for example R. Gächter and H. Müller, Taschenbuch der Kunststoffadditive, Carl Hanser Verlag, 1983, p. 494–510. Another preferred class of pigments is that of white pigments, such as zinc oxide, zinc sulfide, white lead (2 $PbCO_3.Pb(OH)_2$), lithopones, antimony white and titanium dioxide. Of the two commonest crystal forms of titanium dioxide (rutile and anatase), the rutile form is in particular used for white coloration of the molding compositions.

A preferred black pigment which can be used according to the invention is carbon black, mostly as furnace or gas black (see in this connection G. Benzing, Pigmente für Anstrichmittel, Expert-Verlag (1988), p. 78 ff).

Products which are primarily suitable as carbon black are described, for example, in Encyclopedia of Chemical Technology, Vol. 3, p. 34 ff (Interscience Encyclopedia New York).

The colorant is added to the thermoplastic molding compositions in amounts of from 0.001 to 60% by weight, preferably from 0.01 to 30% by weight, in particular from 0.1 to 10% by weight and very particularly from 0.2 to 5% by weight.

The thermoplastic molding compositions may also contain other additives as component C). The proportion of these additives is generally not more than 70% by weight, in particular not more than 50% by weight and very particularly not more than 30% by weight, based on the total weight of components A) to C).

Examples of additives are impact modifiers, which may be present in amounts of up to 20% by weight, preferably up to 15% by weight.

Suitable additives are conventional rubbers, eg. ethylene copolymers with reactive groups, acrylate rubber and polymers of conjugated dienes, for example polybutadiene rubber and polyisoprene rubber. The diene polymers may, in a known manner, be partially or completely hydrogenated. Examples of other possible additives are: acrylonitrile-butadiene rubber, hydrogenated styrene-butadiene rubber, ethylene-propylene-diene rubber, polybutylene rubbers, polyoctenamer rubbers, ionomers, block copolymers of vinylaromatic monomers with dienes, such as butadiene or isoprene (known per se from EP-A 62 282) with the structure $M^1M^2$-, $M^1M^2M^1M^2$- or $M^1M^2M^1$-, where these block polymers may also contain segments with random distribution, and also star-block copolymers. Polymers which have proven particularly suitable are those of conjugated dienes, for example polybutadiene rubber or polyisoprene rubber. Such synthetic rubbers are familiar to the person skilled in the art and are reviewed in Ullmanns Encyklopädie der Technischen Chemie, 4th Edition, Vol. 13, pages 595–634, Verlag Chemie GmbH, Weinheim 1977.

Examples of additives are heat and light stabilizers, lubricants and mold-release agents in the usual amounts. Other additives are reinforcing agents, such as glass fibers, asbestos fibers, carbon fibers, aromatic polyamide fibers and/or fillers, gypsum fibers, synthetic calcium silicates, kaolin, calcined kaolin, wollastonite, talc and chalk.

Low-molecular-weight polymers are also possible additives, polyethylene wax being particularly preferred as lubricant.

Flame retardants C) which may be used are in particular red phosphorus or phosphorus-containing compounds in amounts of up to 20% by weight, preferably up to 10% by weight. Examples of these are phosphoric esters, phosphinic esters, phosphine oxides, phosphorus and organic phosphates, which may be used in combination with a triazine derivative or polytetrafluoroethylene.

The properties of the end products can be controlled as desired to a large extent via the type and amount of these additives.

According to the invention, the pigmented thermoplastic molding compositions are prepared by mixing components A) and B), and also C) if present, in an extruder at the appropriate processing temperatures for the respective thermoplastics within a period of from 0.1 to 20 minutes, preferably from 0.3 to 3 minutes.

It is important that when the colorant B) is added the thermoplastic A) is still solid, ie. is present as pellets or granules. The colorant B) should in particular be added at a temperature which is at least 100° C., preferably at least 30° C., below the glass transition temperature ($T_g$) of the respective thermoplastic A).

The glass transition temperature may be determined by the usual methods, eg. by means of DSC (Differential Scanning Calorimetry) at cooling and heating rates which are usually from 10 to 40° C./min. For the purposes of the invention, the glass transition temperature is also the softening point of the abovementioned thermoplastics A) where these are predominantly amorphous (ie. contain no or little crystalline fraction).

The colorant B) is particularly preferably added at room temperature.

The process may preferably be carried out on single- or twin-screw extruders. These are preferably composed of single barrels which have temperature-controlled jackets. The screws may be constructed with the usual elements, and conveying elements (with or without thrust edges), kneading disks and/or mixing elements may be present. It is moreover possible and frequently advantageous if part of the extruder, ie. sections of the extruder, has retarding or reverse-conveying elements, so that residence time and mix properties may be influenced and controlled.

Particular preference is given to the use of twin-screw extruders with corotating screws, because they are selfcleaning and their residence time profile is more readily adjustable. The extruder is divided into at least 2, if desired more than 2, sections. A section is generally composed of more than one zone, a zone usually having a length of 3 D. The total length of the extruder is from 12 D to 45 D, preferably from 24 D to 36 D (D=diameter of the screw).

Preparation processes which have proven particularly suitable here are

I) in a first zone
  A) metering in from 10 to 99.999% by weight of a thermoplastic polymer metering into an extruder and
II) in a subsequent zone, preferably in the second zone, at temperatures below the respective glass transition temperature of the thermoplastic A)
  B) adding from 0.001 to 60% by weight of a colorant and then heating the thermoplastic mixture in the zones subsequent to step II, homogenizing the polymer melt and extruding the resultant mixture.

The residence time in step I of the process is usually from 1 s to 2 min, preferably from 5 s to 30 s, and the residence time in step II of the process is generally from 0.5 s to 1 min, preferably from 1 s to 30 s.

The additives C) may be-added in the 1st zone and/or into the homogeneous polymer melt.

The properties of the end products can be controlled as desired to a large extent via the type and amount of the additives.

It is advantageous, therefore, if the metering-in of fibrous additives and their processing to give a homogeneous polymer melt is done only after stabilizers, etc. have been added.

In the proximity of the feed aperture in the first section, the screw preferably has conveying elements; further along, there may also be kneading elements. At the end of the first section (homogenizing zone) there is particularly preferably at least one reverse-conveying element which promotes the absorption of energy which needs to occur for melting the thermoplastic and which may be used to influence the residence time in the first section before addition of other additives.

The colorant B) is preferably metered into the second zone of the extruder with suitable apparatus, preferably a coolable or cooled conveying and stuffing screw.

Examples of other suitable apparatus are vibrating troughs.

The separate addition of the colorant B) to the still solid thermoplastic A) achieves good distribution of the color particles. Molding compositions prepared by the novel process have improved color consistency.

The intervals at which differently colored plastics can be produced are greatly shortened.

The novel process has the advantage that it is independent of the type and amount of the individual components.

The molding compositions are particularly suitable for producing moldings by injection molding and extrusion.

EXAMPLES

The following components were used:

Component A

Nylon-6,6 (polyhexamethylene adipamide) with a viscosity number (measured in 96% strength by weight $H_2SO_4$ as 0.5% strength by weight solution, at 25° C. according to ISO 307) of 151 ml/g, corresponding to a relative viscosity $\pi_{rel}$ of 2.7.

Component B

Cu phthalocyanine pigment; Pigment Green 7 or C.I. 74260 (Part 2) (Heliogen® Green K 8730 from BASF AG)

The molding compositions in all examples comprise:
98% by weight of nylon-6,6 and
2% by weight of Cu phthalocyanine pigment
Preparation of the molding compositions Components A) and B) were compounded in a twin-screw extruder (120 rpm; 30 kg/h) at 280° C., extruded, cooled in a water bath and pelletized. The pellets were dried in vacuo at 80° C. and injection molded at 280° C. to give standard test specimens.

In Comparative Examples 1 to 4, component A) and component B) were added together into the 1st zone of the extruder by means of two differential weight feeders.

In Examples 5 to 8, according to the invention, component A) was metered into zone 1 and component B) was separately metered into zone 2 by means of a stuffing screw.

In Comparative Examples 9 to 12, a mixture of A) and B) was prepared in advance in a tumbling mixer, and this mixture was metered into the 1st zone of the extruder.

Further processing was as described above.

For the three different series of experiments, pigmented pellet samples were taken from each experiment at intervals of 30 min. The pellet samples were then injection molded to give small specimen sheets on which calorimetric measurements could be carried out.

The table shows the color deviations $\Delta E$, $\Delta L$, $\Delta a$ and $\Delta b$ with respect to a retained sample. Alongside these, the changes in the color deviations $d\Delta E$, $d\Delta L$, $d\Delta a$ and $d\Delta b$ within a series of experiments consisting of 4 pellet samples is given.

Color measurements according to DIN 5033:

$\Delta E \stackrel{\wedge}{=}$ total color difference according to DIN 6174

$\Delta L \stackrel{\wedge}{=}$ deviation in the light-dark direction $\Delta a \stackrel{\wedge}{=}$ red-green deviation $\Delta b \stackrel{\wedge}{=}$ blue-yellow deviation The preceding sign +/− defines the deviation with respect to the standard or reference point; the reference point in this case is a retained sample of ideal color.

$\Delta L$
  +lighter
  −darker
$\Delta a$
  +redder
  −greener
$\Delta b$
  +yellower
  −bluer The total color difference $\Delta E$ is calculated as follows:

$$\Delta E = \sqrt{\Delta L^2 + \Delta a^2 + \Delta b^2}$$

Measuring equipment: Datacolor DC 3890
Measurement geometry: d/8° (diffuse)
Measurement conditions: incl. gloss
Illuminant: D 65 (daylight)
The results of the measurements are given in the table.

|  | $\Delta E$ | $d\Delta E$ | $\Delta L$ | $d\Delta L$ | $\Delta a$ | $d\Delta a$ | $\Delta b$ | $d\Delta b$ |
|---|---|---|---|---|---|---|---|---|
| Example 1 | 1.38 |  | 0.20 |  | 0.39 |  | −1.31 |  |
| Example 2 | 1.53 |  | 0.43 |  | 1.26 |  | −0.76 |  |
| Example 3 | 2.12 |  | 0.08 |  | 1.87 |  | −1.00 |  |
| Example 4 | 1.25 |  | 0.21 |  | 0.69 |  | −1.02 |  |

-continued

|  | ΔE | dΔE | ΔL | dΔL | Δa | dΔa | Δb | dΔb |
|---|---|---|---|---|---|---|---|---|
| dΔ 1–4 |  | 0.8 |  | 0.3 |  | 1.5 |  | 0.5 |
| Example 5 | 1.38 |  | 0.09 |  | 0.99 |  | −0.95 |  |
| Example 6 | 1.28 |  | 0.25 |  | 0.81 |  | −0.96 |  |
| Example 7 | 1.17 |  | 0.20 |  | 0.65 |  | −0.95 |  |
| Example 8 | 1.43 |  | 0.21 |  | 1.08 |  | −0.92 |  |
| dΔ 5–8 |  | 0.2 |  | 0.2 |  | 0.4 |  | 0.0 |
| Example 9 | 1.04 |  | 0.25 |  | 0.19 |  | −0.99 |  |
| Example 10 | 1.27 |  | 0.17 |  | 0.86 |  | −0.92 |  |
| Example 11 | 1.26 |  | 0.24 |  | 0.87 |  | −0.88 |  |
| Example 12 | 1.20 |  | 0.21 |  | 0.63 |  | −1.00 |  |
| dΔ 9–12 |  | 0.3 |  | 0.1 |  | 0.7 |  | 0.1 |

What is claimed is:

1. A continuous process for preparing pigmented thermoplastic molding compositions in an extruder, which comprises
    I) in a first zone
        A) metering in from 10 to 99.999% by weight of a thermoplastic polymer into an extruder and
    II) in a subsequent zone at temperatures below the respective glass transition temperature of the thermoplastic polymer of step A)
        B) adding from 0.001 to 60% by weight of a pulverulent colorant and
then heating the thermoplastic/colorant mixture in the subsequent zone, homogenizing the polymer melt and extruding the resultant mixture.

2. A process as claimed in claim 1, wherein from 0 to 70% by weight of other additives C) are added into the first zone and/or into the homogeneous polymer melt, where the percentages by weight of components A) to C) respectively give a result of 100%.

3. A process as claimed in claim 1, wherein, in step II, the colorant B) is added at a temperature which is in each case at least 10° C. below the glass transition temperature of thermoplastic A).

4. A process as claimed in claim 1, wherein the colorant B) is added at room temperature.

5. A process as claimed in claim 1, wherein the thermoplastic polymer of step A) is selected from the group consisting of polyoxymethylenes, polyamides, polyesters, vinylaromatic polymers, polyarylene ethers, polyolefins, polycarbonates, poly(meth)acrylates and mixtures of these.

6. A process as claimed in claim 1, wherein a pigment is used as colorant B).

7. A process as claimed in claim 1, wherein the colorant B) is introduced into the extruder by means of a stuffing screw.

* * * * *